(12) United States Patent
Brown

(10) Patent No.: US 6,985,159 B2
(45) Date of Patent: Jan. 10, 2006

(54) ARRANGEMENTS FOR ANTIALIASING COVERAGE COMPUTATION

(75) Inventor: Patrick R. Brown, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/140,113

(22) Filed: May 8, 2002

(65) Prior Publication Data
US 2003/0210251 A1 Nov. 13, 2003

(51) Int. Cl.
G09G 5/00 (2006.01)

(52) U.S. Cl. .................. 345/611; 345/613; 345/614; 345/947; 382/269; 358/3.27

(58) Field of Classification Search ............ 345/611, 345/612, 613, 614, 615, 947; 382/269, 270, 382/266; 358/3.27
See application file for complete search history.

(56) References Cited

U.S. PATENT DOCUMENTS

| | | | | |
|---|---|---|---|---|
| 5,461,703 A | * | 10/1995 | Goyins et al. | 358/1.9 |
| 5,559,529 A | * | 9/1996 | Maher | 345/613 |
| 6,329,977 B1 | * | 12/2001 | McNamara et al. | 345/589 |
| 6,433,790 B1 | * | 8/2002 | Taylor et al. | 345/611 |

* cited by examiner

Primary Examiner—Matthew C. Bella
Assistant Examiner—Antonio Caschera
(74) Attorney, Agent, or Firm—Schwegman, Lundberg, Woessner & Kluth, P.A.

(57) ABSTRACT

Improved arrangements for antialiasing coverage computations, useable in numerous embodiments, a non-exhaustive/non-limiting listing including graphics chips, chipsets, systems, methods and software embodiments.

18 Claims, 9 Drawing Sheets

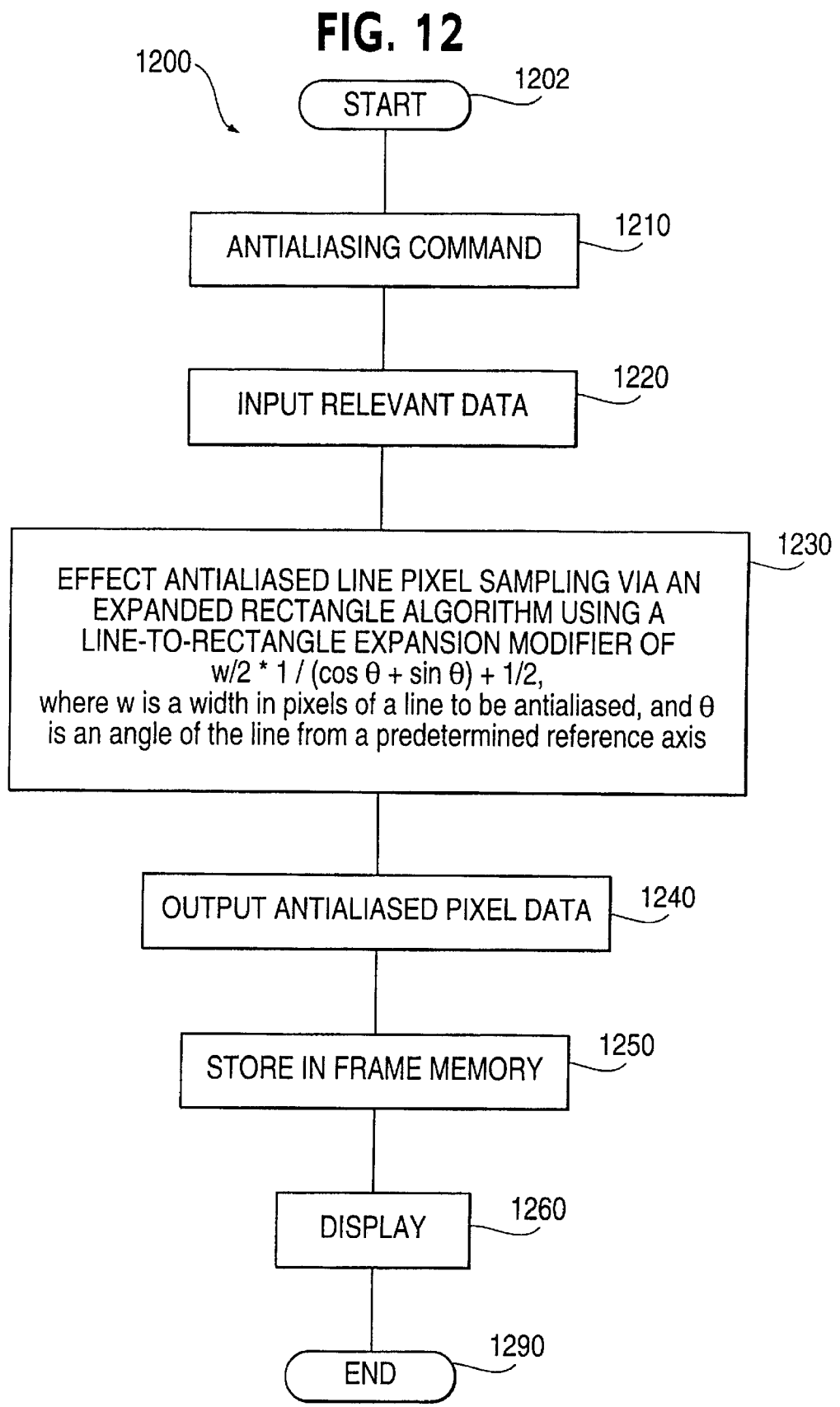

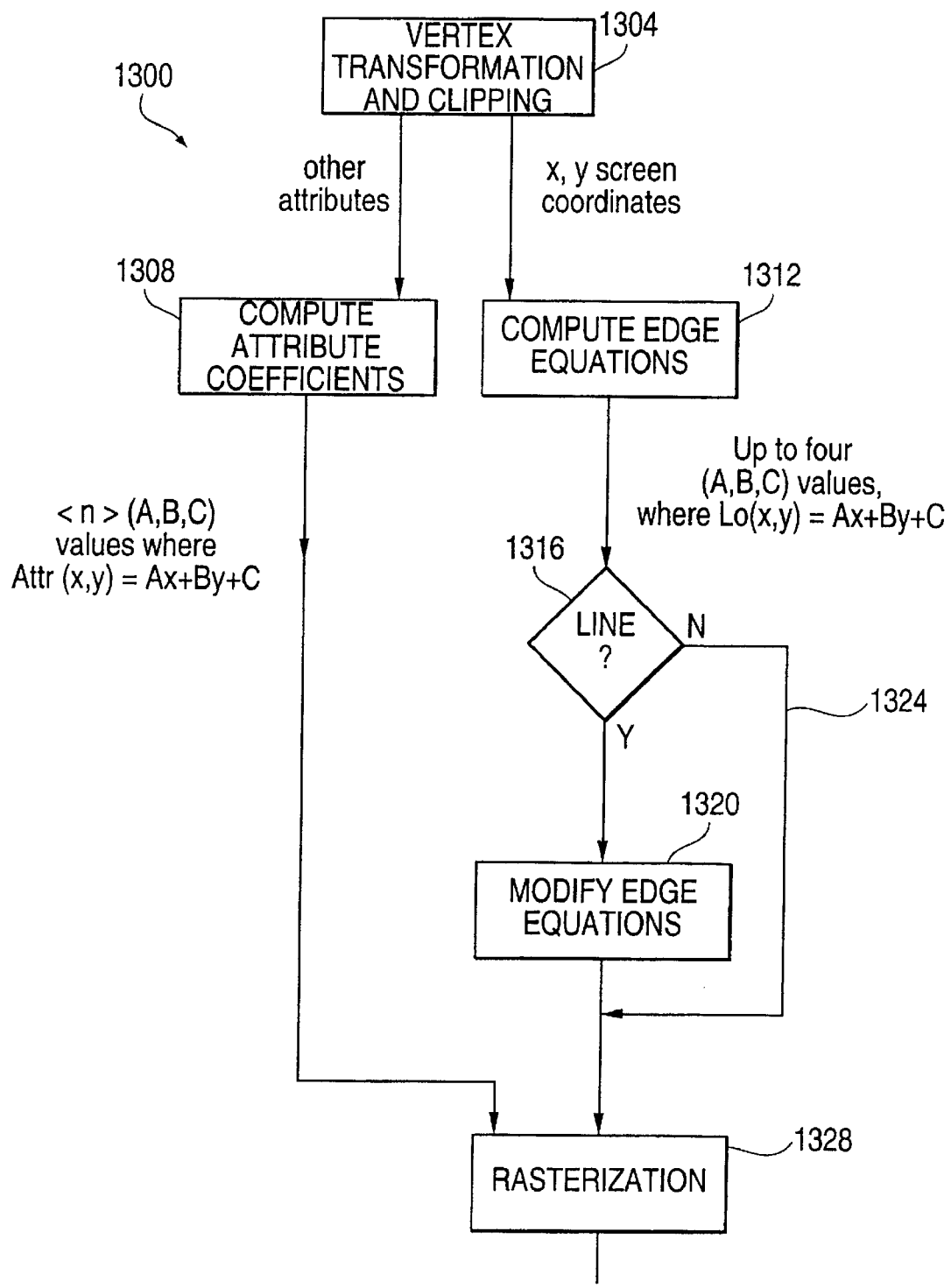

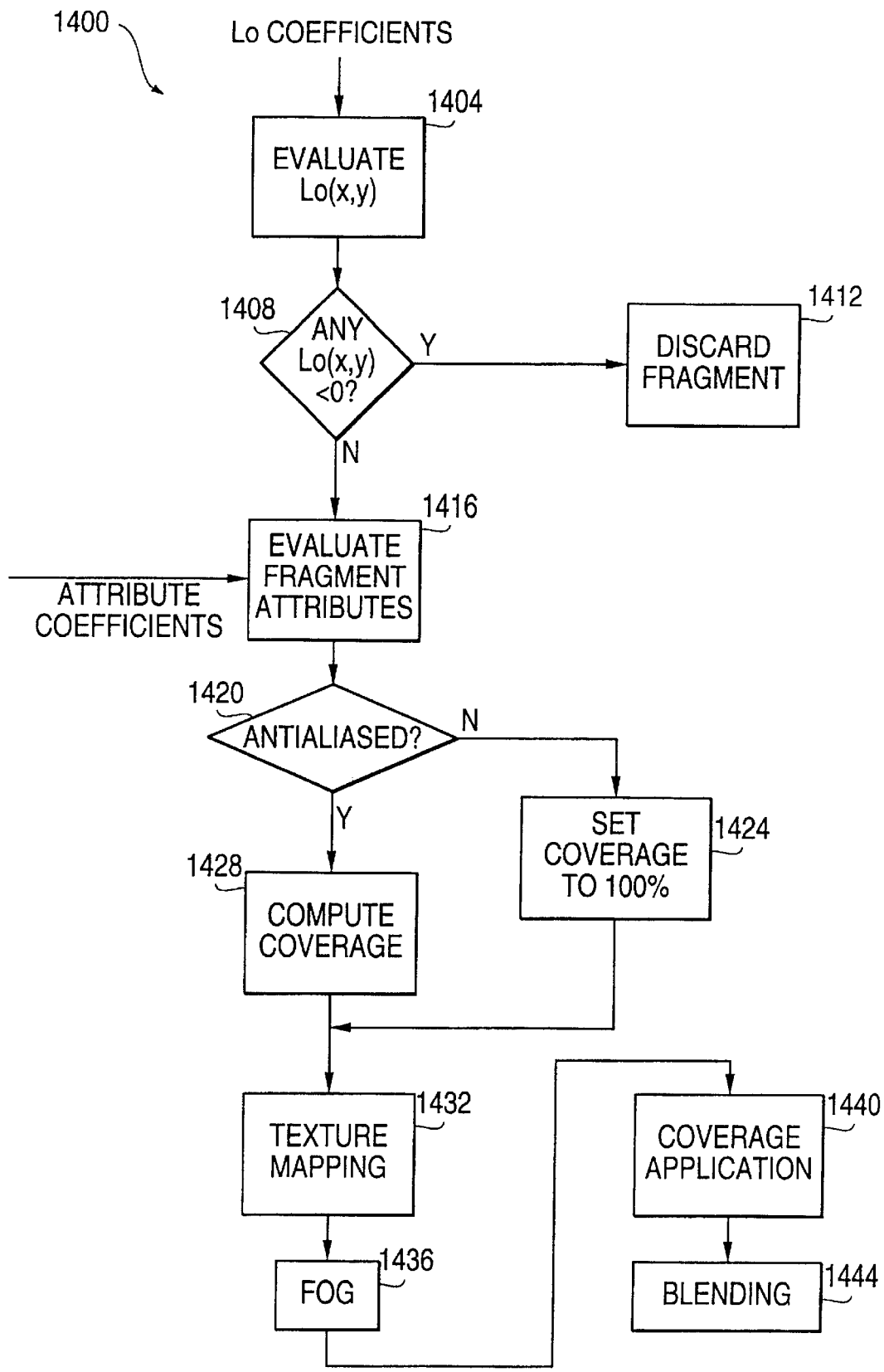

ARRANGEMENTS FOR ANTIALIASING COVERAGE COMPUTATION

FIELD

The present invention is directed to improved arrangements for antialiasing coverage computation.

BACKGROUND

As background to ensure familiarity with the term and concept, antialiasing is a graphical corrective measure in which the jagged edges of displayed lines, letters, numerals, etc., are attempted to be smoothed or rounded, so as to make them appear more visually continuous such that they look more like smooth lines, letters, numerals, etc., rather than jagged ones made from steps or blocks. An arrangement may accomplish this by calculating and placing pixels of appropriate shading levels in jagged areas where smoothing or rounding is desired to take place.

Ideal (i.e., perfect) antialiasing requires intensive resources (e.g., very complex hardware designs) which may not be cost-effective in the marketplace. Accordingly, less than ideal antialiasing arrangements may be used for affordable, but less-than-perfect antialiasing. What are needed are continued improvements in affordable antialiasing arrangements.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein:

FIG. 12 is an example flowchart concerning an example method embodiment of the present invention, useable, for example, with the FIGS. 10–11 example embodiments;

FIG. 13 is an example flowchart concerning example operations conducted by a 3D engine of the FIGS. 10–11 example embodiments; and FIG. 14 is an example flowchart concerning example operations conducted with respect to the FIG. 13 rasterization operation.

DETAILED DESCRIPTION

Figure 1:
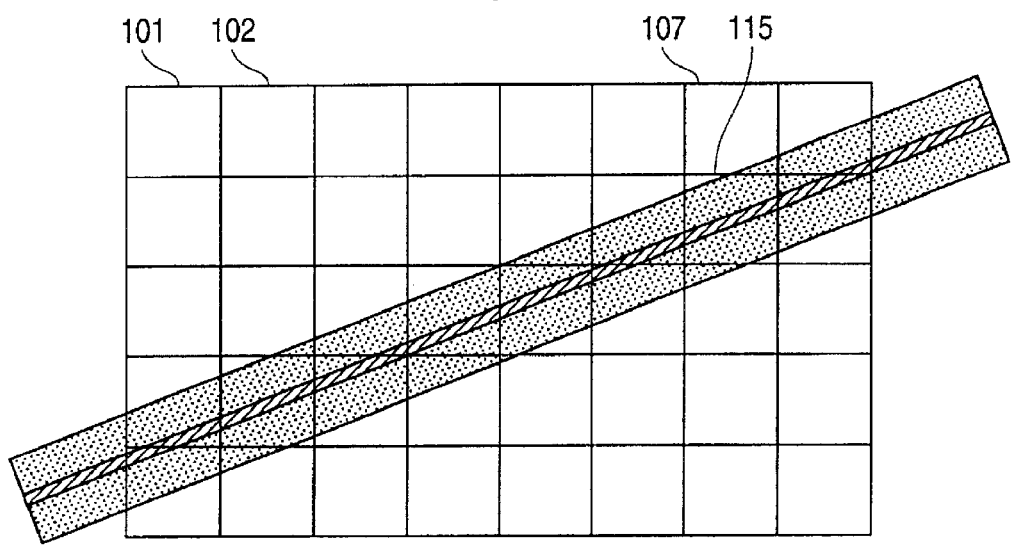
FIGS. 1–2 are graphical depictions of example line segments, such depictions being useful in gaining a more thorough understanding/appreciation of background as well as example embodiments of the present invention.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions throughout this document, terms such as "processing" or "computing" or "calculating" or "determining" or "displaying" or the like refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

When appropriate, like reference numerals and characters may be used to designate identical, corresponding or similar components in differing figure drawings. Further, in the detailed description to follow, example sizes/models/values/ranges may be given, although the present invention is not limited to the same. Example arbitrary axes (e.g., X-axis, Y-axis and/or Z-axis) may be discussed/illustrated, although practice of embodiments of the present invention is not limited thereto (e.g., differing axes directions may be able to be assigned). Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within the purview of one skilled in the art. Where specific details (e.g., circuits, flowcharts) are set forth in order to describe example embodiments of the invention, it should be apparent to one skilled in the art that the invention can be practiced without, or with variation of, these specific details.

Although example embodiments of the present invention will be described using example antialiasing arrangements for rendering lines or line segments in a graphics accelerator device, neither practice of the present invention nor the scope of the appended claims is limited thereto. For example, practice and a scope covers the rendering of more complex graphical objects such as letters, numerals, etc. For example, antialiasing may be applicable to edges of such objects, especially considering the fact that the edges of such complex objects may be envisioned/processed as being formed of a plurality of line segments. Throughout the disclosure and claims, the term "line" may be used generically to reference a generic item subjected to antialiasing (e.g., lines, line segments, edges, etc. antialiasing). As further discussed, the practice and scope of the present invention is not limited to purely hardware arrangements (e.g., graphics accelerator devices) or purely software arrangements, and in fact, the invention may be practiced in either arrangement or with many different hardware/software combinations.

Beginning the detailed description, FIG. 1 is a graphical depiction of an example line segment, such depiction being useful in gaining a more thorough understanding/appreciation of background as well as example embodiments of the present invention. Within FIG. 1 (and similar FIGS.), pixel grid rectangles (e.g., 101, 102) are shown arranged in a grid array.

Within FIG. 1, an example line segment in a 3D graphics system can be envisioned as being a plurality of points interconnected between two end points and having a width associated therewith. An "ideal" line-rendering algorithm draws a line segment as a rectangle, i.e., as shown representatively by the shaded rectangle in FIG. 1. In this example, the line segment itself defines the width of the rectangle by connecting the midpoints of two of the edges. The height of the rectangle being drawn is given by a line width programmed by a graphics application using a standard graphics API. In the industry standard OpenGL®API, the line width is programmed by calling the function glLineWidth( ).

During display, such a line may contribute to the brightness of all pixels that intersect the rectangle. The brightness contributed to each pixel may be equal to the percentage of the pixel grid rectangle area covered by the line segment rectangle. For example, pixel grid rectangles (e.g., 115; FIG. 1) fully or mostly covered by the line segment get a full contribution, whereas pixel grid rectangles (e.g., 107) that are barely touched get very little contribution. Accordingly, brightness depends upon the amount of-the pixel grid rectangle area covered by the expanded line.

In practice, it is computationally expensive to compute the coverage of each pixel touched using an ideal line rasterization algorithm. Instead, actual implementations (such as the present invention) generally attempt to approximate the coverage of the ideal line rasterization algorithm for economy purposes.

Figure 2:
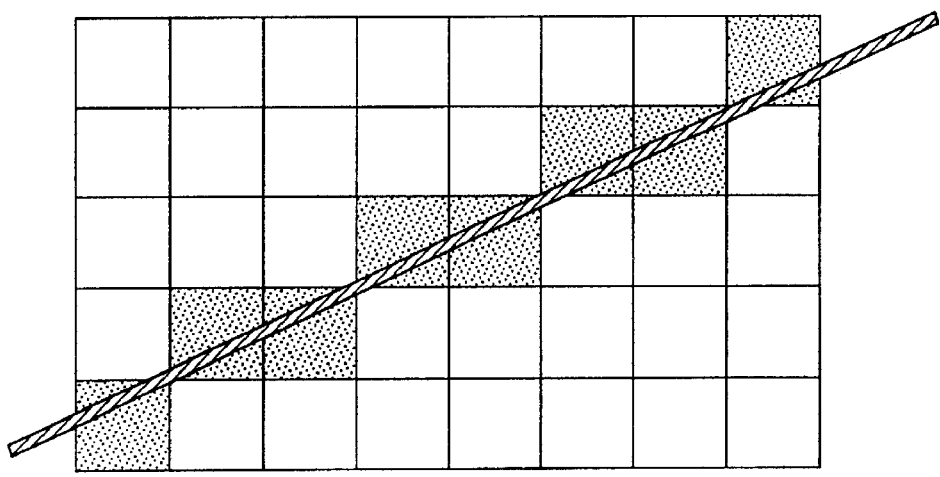

As one disadvantageous approach, one of the lowest-quality approximations contributes full brightness to exactly one pixel in each row or column, for example, as shown in FIG. 2. These lines, referred to as aliased lines, require fewer computational resources to draw, and so can generally be drawn with higher performance (i.e., faster) than antialiased lines. Accordingly, such a drawing algorithm may be the default line-rendering algorithm in, for example, low-end graphics accelerators. Despite the low cost, a tradeoff is that such algorithm may produce lines with obviously jagged edges. Moreover, such lines will flicker when they move. These problems are commonly referred to as "the jaggies" or aliasing artifacts.

Because jaggies or artifacts are unacceptable in a wide range of graphics applications, it is highly desirable for graphics hardware to implement a higher quality antialiasing algorithm. More particularly, more advantageous line antialiasing algorithms may attempt to achieve the following enumerated Goals (all of which are achieved by an actual ideal algorithm):

1. Draw lines without visible "jaggies";
2. Lines should be rendered with a total brightness approximately equal to the area of the rectangle (sum of the computed coverages should closely match the ideal coverage);
3. The total brightness of the line should be independent of a line's orientation, i.e., a diagonal line should have the same overall brightness as a vertical or horizontal line of the same length, even though it spans fewer columns or rows; and
4. The coverage computed for each pixel should be approximately equal to the area of the intersection of the rectangle corresponding to the line and the square corresponding to the pixel.

Some graphics accelerators may render antialiased lines as rectangles using essentially the same hardware used to draw polygons, i.e., using polygon sampling. Such algorithm attempts to match the "ideal" computational model in that they both draw rectangles. However, the hardware draws a polygon subject to normal polygon sampling rules, and only lights pixels whose centers are covered by the rectangle. In contrast, the "ideal" algorithm lights all pixels that are touched at all by the rectangle.

Figure 3:
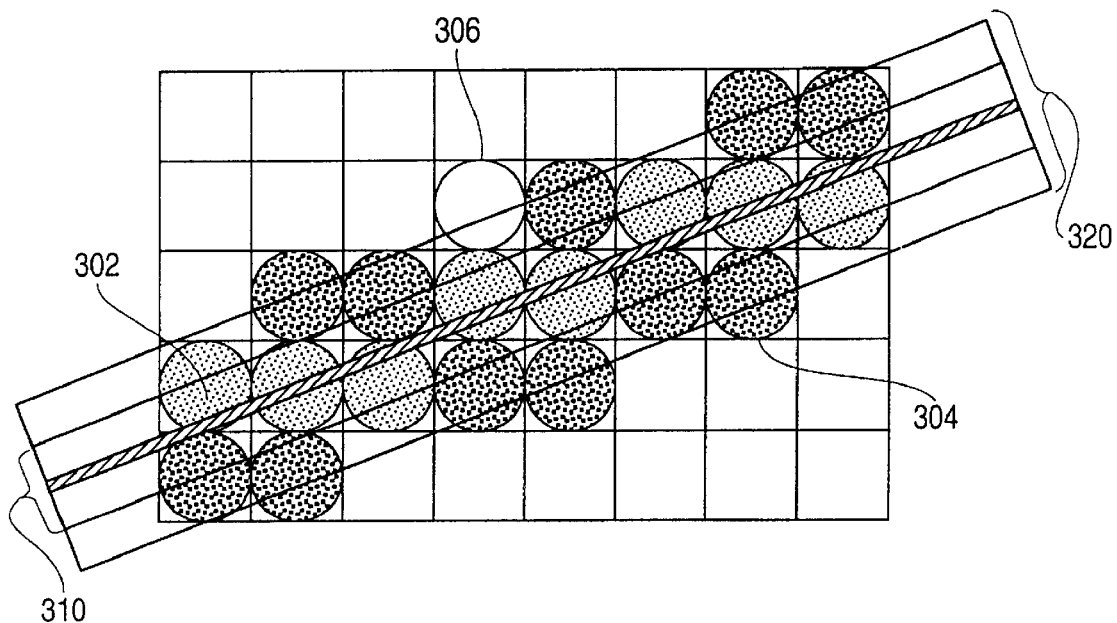
FIG. 3 is a graphical depiction of an example antialiased line pixel sampling applied to an example line segment using polygon sampling rules, such depiction being useful in gaining a more thorough understanding/appreciation of background as well as example embodiments of the present invention.

To more closely match the ideal algorithm, the antialiased line drawing algorithm may draw an expanded rectangle as shown in FIG. 3. More particularly, FIG. 3 graphically illustrates an example of antialiased line pixel sampling using polygon sampling rules. FIG. 3 illustrates example (shaded) pixels, each with its pixel center hit by both a normal (unexpanded) rectangle 310 and an expanded rectangle 320 using the normal polygon sampling rules. As examples, pixel 302 (first type of shading) is one having its pixel center covered by both the normal rectangle 310 and expanded rectangle 320, pixel 304 (second type of shading) is one covered by the expanded rectangle 320 but missed by the normal rectangle 310, and finally, pixel 306 (un-shaded) is one having its pixel center missed by both the normal rectangle 310 and the expanded rectangle 320.

The pixels hit by ideal algorithm are those that are touched at all by the unexpanded rectangle. In theory, this expanded rectangle algorithm advantageously leverages the polygon rasterization hardware to touch approximately the same pixels as an ideal antialiased line-rendering algorithm. One example approach is as follows:

For each line or edge, the hardware computes a quantity $Lo'(x,y)$ at each pixel $(x,y)$, where:

$$Lo'(x,y)=(\Delta Y/(\Delta X+\Delta Y))*(x-x0)+(\Delta X/(\Delta X+\Delta Y))*(y-y0) \quad \text{(Eq. Ln. 1)}$$

In this formulation, $(x,y)$ gives the coordinates of the pixel center, $(x0,y0)$ and $(x1,y1)$ are the endpoints of the line, and $\Delta X$ and $\Delta Y$ are defined as $x1-x0$ and $y1-y0$, respectively. The actual line is defined by the set of $(x,y)$ values, where $Lo'(x,y)=0$. To generate two rectangle edges parallel to the line, in a semi-advantageous arrangement, let:

$$Lo1(x,y)=Lo'(x,y)+K, \text{ and} \quad \text{(Eq. Ln. 2)}$$

$$Lo2(x,y)=K-Lo'(x,y), \quad \text{(Eq. Ln. 3)}$$

where $K=(w+1)/2$, and w is the programmed width of the line in pixels. The area between the two edges is given by the set of points $(x,y)$, where $Lo1(x,y)>0$ and $Lo2(x,y)>0$.

The coverage applied to a pixel centered at $(x,y)$ corresponding to a given rectangle edge is:

$$C = 0, \quad \text{if } Lo(x, y) < 0, \quad \text{(Eq. Ln. 4)}$$

$$= Lo(x, y), \quad \text{if } 0 <= Lo(x, y) < 1, \text{ and} \quad \text{(Eq. Ln. 5)}$$

$$= 1, \quad \text{if } Lo(x, y) > 1. \quad \text{(Eq. Ln. 5)}$$

For each pixel covered by the expanded rectangle, coverages are computed against the four rectangle edges and combined (by multiplication) to yield a final coverage.

Turning now to further analysis, a quality of the algorithm method can be analyzed using a column sum metric, which is defined as the sum of the coverage values in a given column of pixels. This metric will give a reasonable indication of whether or not the brightness of the line matches the area of the rectangle used in the ideal algorithm. However, the column sum metric as applied here has several limitations, such as:

This metric ignores the influence of end caps, which are the edges perpendicular to the line. It assumes that the line is sufficiently long for the end caps to have no influence on the column tested. The end caps are believed not to be a problem in the semi-advantageous algorithm;

This metric works on only X-major lines (where the difference in X is larger than that in Y). An equivalent row sum metric can be used for Y-major lines; and The semi-advantageous method does not produce constant column sums; i.e., some columns can be brighter than others, depending on the position of the line. To compensate for this effect, an average column sum may be used, which is the average of the column sums for the same line as it is shifted up and down by fractions of pixels.

Under the semi-advantageous method, the average column sum is $w*(1+|\tan \theta|)$, where $\theta$ is the angle between the line and the X axis. The method used to derive this value will be discussed below, with analysis of the variance of the non-constant column sums resulting from the semi-advantageous method.

Under the method described above, the column sum is the area of the intersection of the rectangle corresponding to the line and the column of pixels. The intersection, discussed ahead (FIG. 4 and associated discussion), is a parallelogram with a width of 1 and a height of $w/\cos \theta$, where w is the width of the line and $\theta$ is the angle between the line and the X axis. The area/column sum for the ideal method is therefore $w/\cos \theta$.

For horizontal lines ($\theta=0°$), the semi-advantageous method produces the same column sum as the ideal method. However, for diagonal lines (e.g., $\theta=45°$), the average coverage of a 1-pixel wide line is 2.0 using the semi-advantageous method, versus 1.414 for the ideal method. In general, diagonal lines produced by the semi-advantageous method are too bright. In addition, the overall brightness of a line changes significantly as it is rotated. In summary, the semi-advantageous method fails to satisfy a number of the Goals (in particular, Goals 2 and 3) which were enumerated previously.

Turning now to advantageous embodiments, such improve on the semi-advantageous method in that the embodiments use a different choice of the Lo modifier K specified above. Recall that in the semi-advantageous method, K is set to $(w+1)/2$, where w is the actual width of the line. In the advantageous method, K is instead chosen as:

$$K=w/2*(1/(\cos \theta+\sin \theta))+\frac{1}{2}. \qquad \text{(Eq. Ln. 7)}$$

This value of K was chosen to achieve results that closely match the ideal method, while continuing to use the basic logic behind the semi-advantageous algorithm. Again, the rationale behind the choice of this constant is described in detail in supporting disclosure ahead. That is, the value K is dependent on the $\Delta X$ and $\Delta Y$ terms, and can be computed by rasterization hardware in a number of different ways. In one example embodiment, hardware identifies the most significant bits in the two terms and uses these bits to extract the volume of $1/(\cos \theta+\sin \theta)$ from a table of precomputed values.

In the supporting disclosure ahead, a detailed example is provided using a 1-pixel line at a 26.56 degree angle from the X-axis, where $\tan \theta$ is $\frac{1}{2}$. In quality analysis using the 26.56 degree angle, the average column sum is 1.141 using the advantageous method, but 1.500 using the semi-advantageous method. The advantageous method shows significant improvement in that the column sum for the ideal method is 1.119, which is only 2% off from the advantageous method. As a further sign of overall improvement, an analysis of 1-pixel wide lines at all angles determined that the average column sums for the advantageous method and the ideal method differed by no more than 3.03% (compared to 41% with the semi-advantageous method).

Similar absolute differences between the advantageous and ideal methods can be achieved on wider lines, while the difference in brightness increases significantly for wider lines using the semi-advantageous method. As it closely matches the ideal algorithm, the advantageous algorithm will satisfy the Goals laid out above far better than the semi-advantageous one.

Accordingly, as this advantageous algorithm provides significantly higher quality antialiased lines than the above-described (and other) semi-advantageous arrangements, the advantageous algorithm provides an improved and acceptable low-cost platform for users of such products.

With an example embodiment generally explained above, discussion now turns to more theoretical analysis to further explain background and concept, and eventually lead to further example embodiments of the present invention. Discussion turns first to background disadvantageous approach so as to improve an understanding of the present invention.

Figure 4:
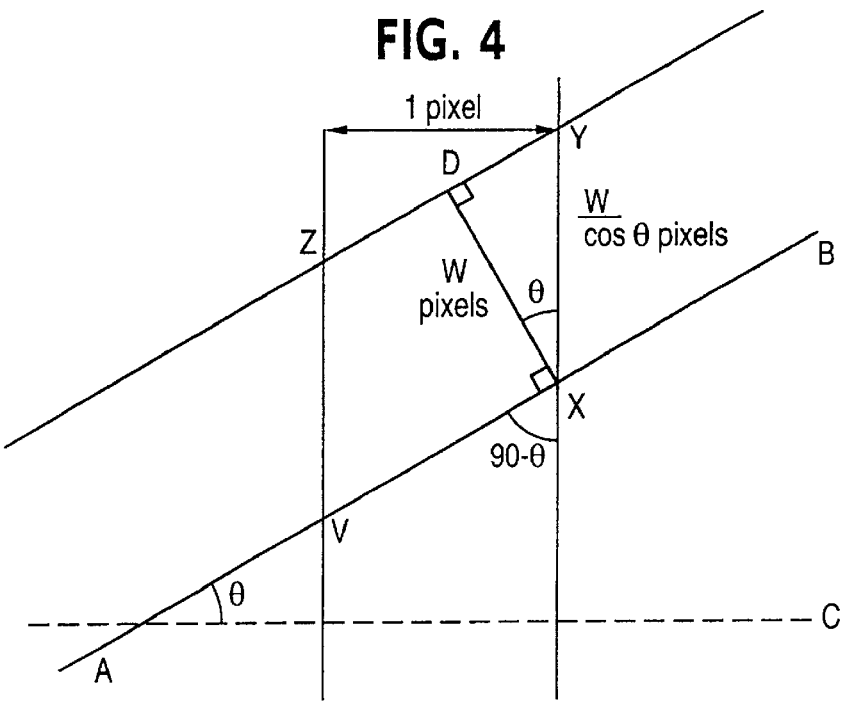
FIGS. 4–9 are graphical depictions concerning theoretical coverages, such depictions being useful in gaining a more thorough understanding/appreciation of background as well as example embodiments of the present invention.

Again, a good metric for accuracy of coverage calculations for an X-major line is the sum of coverages in each column (for Y-major lines, it is the sum of coverages in each row). FIG. 4 is a graphical depiction useful in understanding a sum of coverage with respect to an example line segment versus an example column. Turning to FIG. 4, there is computed the ideal coverage, which is the area of a 1-pixel wide parallelogram (delineated by corners V, X, Y, Z). If w is the width of the line and $\theta$ denotes the angle between the line A-B and the major axis C, the total area of the parallelogram is $w/\cos \theta$. This means that the coverage for each column should increase with the angle $\theta$. (For constant-length lines, the number of columns hit will decrease with $\theta$)

One semi-advantageous approach has gotten best results by programming a line width register to the true line width plus one pixel, and programming an antialiasing region register to "two pixels." In this case, the column coverage for horizontal lines adds up to one. The column coverage for 45-degree (diagonal) lines, however, adds up to two, which is far above the theoretical value of sqrt(2)=1.414.

To continue, when the above approach generates virtual rectangle edges, it does so by tweaking the line equation. That is, for each edge, the hardware computes coefficients A, B and C, where the actual line is defined by the (x,y) values where $Ax+By+C=0$. If we let $\Delta X$ denote the difference in X values between the two endpoints (x1,y1) and (x2,y2), and $\Delta Y$ denote the difference in Y values, then A, B and C are computed as:

$$A=\Delta Y/(\Delta X+\Delta Y); \qquad \text{(Eq. Ln. 8)}$$

$$B=\Delta X/(\Delta X+\Delta Y); \text{ and} \qquad \text{(Eq. Ln. 9)}$$

$$C=-(A*x1+B*y1). \qquad \text{(Eq Ln. 10)}$$

The expanded edges of the line are given by the equations:

$$Lo1(x,y)=Ax+By+C+K; \text{ and} \qquad \text{(Eq. Ln. 11)}$$

$$Lo2(x,y)=K-(Ax+By+C). \qquad \text{(Eq. Ln. 12)}$$

To account for the line width, the constant K is simply set to w/2, where w denotes the programmed line width. For best results in the semi-advantageous method, the programmed line width is set to w+1, where w is the true line width specified by the application. In this approach, the column coverage for horizontal lines adds up to one. The column coverage for 45-degree (diagonal) lines, however, as mentioned previously, adds up to two, which is far above the theoretical value of sqrt(2)=1.414.

This expansion results in a rectangle similar to the ideal rectangle. However, coverage is not computed directly. Instead, all pixels inside the boundaries of the rectangle are lit. The coverage applied to a pixel for a given edge with a center at point P is defined simply as:

$$C = Lo(P), \text{ if } 0 <= Lo(P) < 1; \text{ and} \quad \text{(Eq. Ln. 13)}$$

$$= 1, \quad \text{if } Lo(P) > 1. \quad \text{(Eq. Ln. 14)}$$

For a given column, let $P_{top}$ denote the y coordinate of intersection of the top of the expanded rectangle with the center of the column, $P_{mid}$ denote the y coordinate of the intersection of the specified line and the column center, and $P_{bot}$ denote the y coordinate of the intersection of the bottom of the expanded rectangle with the column center.

For the top edge, it is known that the $Lo(P_{top})$ is 0, and $Lo(P_{mid})$ is w/2. It is concluded then that the vertical distance between $P_{top}$ and $P_{mid}$ is:

$$w/2*(\Delta X+\Delta Y)/\Delta X. \quad \text{(Eq. Ln. 15)}$$

For a point P in the same column with a y coordinate between $P_{top}$ and $P_{mid}$, the computed coverage is:

$$MIN(1.0, (P-P_{top})*(\Delta X/(\Delta X+\Delta Y))). \quad \text{(Eq. Ln. 16)}$$

Figure 5:
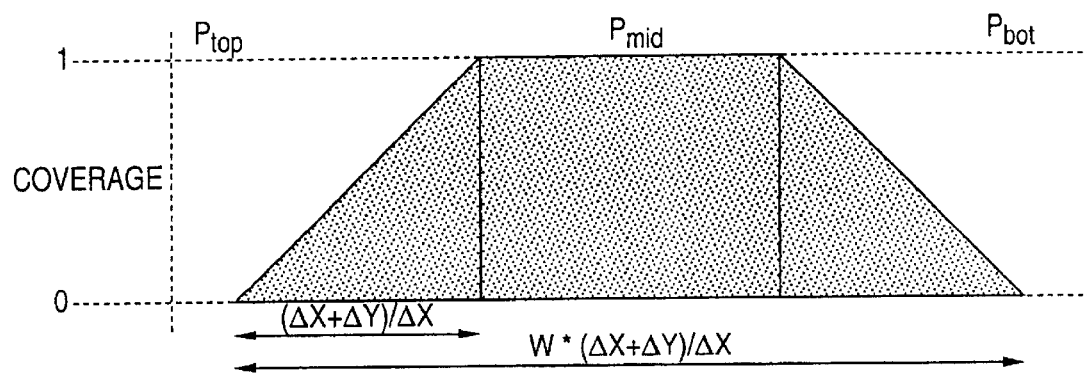

The same pattern occurs between $P_{mid}$ and $P_{bot}$. The overall coverage ends up similar in appearance to FIG. 5.

When intersecting the rectangle with a column, this coverage curve will be sampled at equally-divided points spaced by one pixel, and the sum of the sampled values will reflect the coverage for a column. On average, the coverage for a column will equal the area under the curve, which is: (W−1)*(ΔX+ΔY)/ΔX. Noting that ΔY/ΔX=tan θ and that the one may program W as the real width plus one, the average column coverage ends up being:

$$w*(1+\tan\theta), \quad \text{(Eq. Ln. 17)}$$

instead of the ideal coverage of $$w/\cos\theta. \quad \text{(Eq. Ln. 18)}$$

For one-pixel wide lines at 45 degrees, this means an average coverage of 2 instead of sqrt(2)=1.414. This results in significantly wider/brighter lines.

Figure 6:
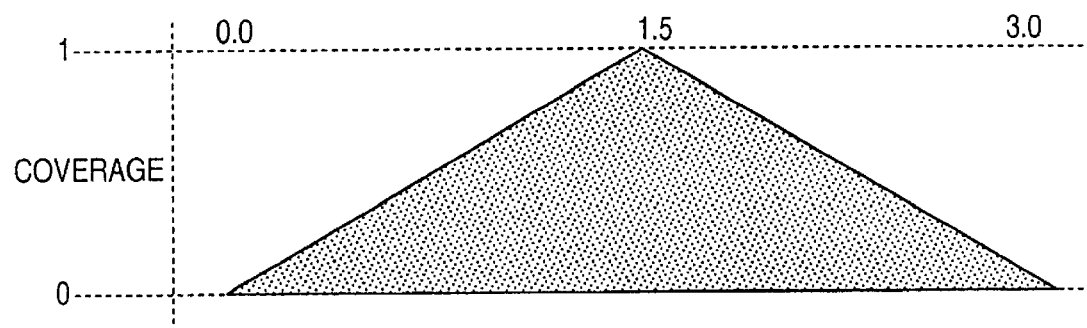

The other interesting characteristic of this algorithm is that for real lines, the coverage is sampled at points spaced one pixel apart. This means that the coverage sums can vary significantly simply based on the position of the line. Consider an example where w=2 (standard 1-pixel line and tan θ=0.5). The coverage pattern appears similar to FIG. 6.

In this example, let y denote the distance from $P_{top}$ to the first pixel center sampled. Then the coverage curve is sampled at distances y, y+1, and y+2 from $P_{top}$. The sampled coverage value at distance d is:

$$C(d)=\tfrac{2}{3}*d, \text{ with } d<=1.5; \text{ and} \quad \text{(Eq. Ln. 19)}$$

$$C(d)=\tfrac{2}{3}*(3-d), \text{ with } d>1.5. \quad \text{(Eq. Ln. 20)}$$

When adding the three samples, there are two cases:

$$\begin{aligned}
C_{sum}(y) &= C(y) + C(y+1) + C(y+2); & \text{(Eq. Ln. 21)} \\
&= 2/3*y + 2/3*(y+1) + 2/3(1-y), \text{ if } y <= 0.5 \text{ or} & \text{(Eq. Ln. 22)} \\
&\quad 2/3*y + 2/3*(2-y) + 2/3(1-y), \text{ if } y > 0.5; \text{ and} & \text{(Eq. Ln. 23)} \\
&= 2/3*(2+y), & \text{if } y <= 0.5 \text{ or} & \text{(Eq. Ln. 24)} \\
&\quad 2/3*(3-y), & \text{if } y > 0.5. & \text{(Eq. Ln. 25)}
\end{aligned}$$

This means that, while the average sum is 1.5 (1+tan θ), one will get an actual sum of 1.33 when y=0, which increases to 1.66 when y=0.5, and then decreases again to 1.33 as y approaches 1. What this means (in this example) is that the coverage sum for a column can vary by as much as 25%. Fortunately, when going between columns, the y value will generally change (in this example it toggles between two values), so the overall coverage of the line doesn't vary as widely.

Figure 7:
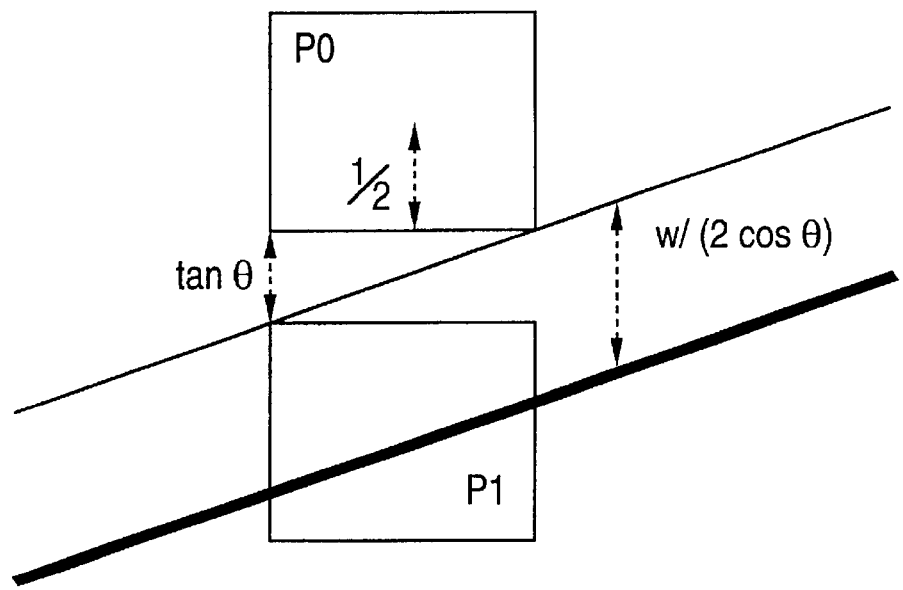

Discussion turns next to figuring out a formula for coverage in the ideal case, and thus attention is directed to FIG. 7. Let P0 denote the y coordinate of the center of a 1×1 pixel square that just brushes, but is above, the edge of a properly expanded line-rectangle. P0 does not necessarily correspond to an actual pixel on the screen. P0 will provide no coverage. Similarly, let P1 denote the y coordinate of the center of the pixel that just brushes, but is below, the same edge. P1 will get full coverage. The distance between P0 and P1 turns out to be 1+tan θ pixels, which is incidentally the same distance it takes for Lo to go from 0 to 1 in the aforementioned hardware. This suggests that the "antialiasing region" algorithm of the aforementioned hardware, where coverage tails off in proportion to Lo, could be used to approximate the falloff of actual coverage values.

Figure 8:
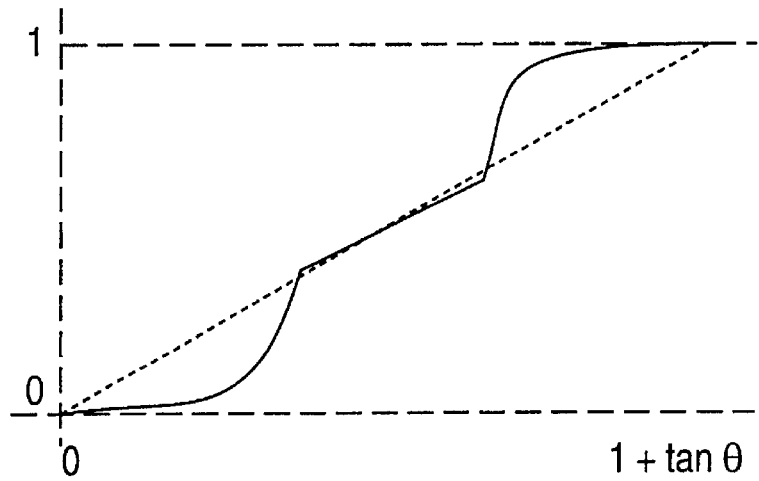

The "antialiasing region" algorithm assumes that coverage drops off linearly with the distance from P0 to P1. That is not quite true. The function is broken into three pieces and is quadratic near P0 and P1 and linear in the middle. It looks similar to FIG. 8. The solid curve shows coverage as a function of distance from P0; the dashed line shows the linear approximation. The size of the curved areas is a function of the angle θ; the curve is almost entirely linear for nearly horizontal lines and has almost no linear section for diagonal lines.

Other than the errors due to the linear coverage approximation, one other difference between the algorithms is the distance over which coverage is applied. This distance and the constant K applied to Lo in the aforementioned algorithm are proportional, where:

$$D=K*(1+\tan\theta). \quad \text{(Eq. Ln. 26)}$$

In such algorithm, K is simply (w+1)/2, where w is the ideal width of the line. Recall that the driver programs the hardware with the true width plus one, so the hardware simply adds w/2.

Turning next to the proposed algorithm, in the "ideal" algorithm (see FIG. 7), the distance D between P0 and $P_{mid}$ is:

$$D = w/(2\cos\theta) + \frac{1}{2} + \frac{1}{2}\tan\theta, \quad \text{(Eq. Ln. 27)}$$

$$= w/(2\cos\theta) + \frac{1}{2} * (1 + \tan\theta). \quad \text{(Eq. Ln. 28)}$$

This means that the desired Lo constant K is simply D/(1+tan θ), or:

$$K = (w/(2\cos\theta))/(1 + \tan\theta) + \frac{1}{2}, \quad \text{(Eq. Ln. 29)}$$

$$= w/2 * 1/(\sin\theta + \cos\theta) + \frac{1}{2}. \quad \text{(Eq. Ln. 30)}$$

Figure 9:
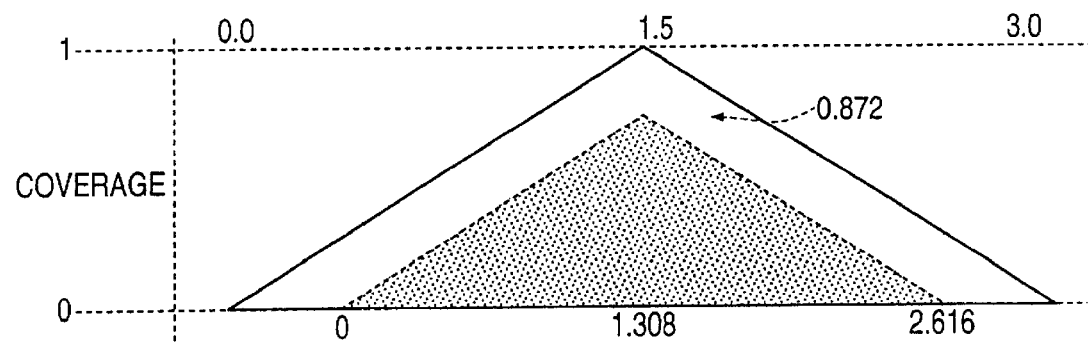

FIG. 9 depicts the coverage distribution for the same line analyzed earlier, where w=1 and tan θ=0.5. In this example, sin θ=0.447, cos θ=0.894, and (sin θ+cos θ)=1.342. K is computed to be 0.872 and D is therefore 1.308. The coverage distribution for the modified algorithm is shown shaded, and is overlaid on the coverage distribution for the original algorithm. In this approach, the coverage applied is the minimum of the Lo values for the two expanded edges, since for narrow lines, the two Lo values will not reach 1.0 simultaneously. The average coverage sum is computed in the same way as before and is 1.309*0.872=1.141. The theoretical coverage is 1/cos θ, or 1.119, for a difference of 2%. The difference between the average coverage using the modified algorithm and the theoretical coverage of 1/cos θ does not exceed 3.03% (at 45 degrees).

Turning next to conclusion, the semi-advantageous line drawing algorithm can be adapted to produce overall results much closer to those of an ideal line drawing algorithm simply by tweaking the constant used to modify the Lo values for the edges of the rectangle. Instead of adding w/2 to Lo, the hardware should add:

$$\frac{1}{2} + w/2 * 1/(\sin\theta + \cos\theta) \quad \text{(Eq. Ln. 31)}$$

Therefore, a reasonable approximation of 1/(sin θ+cos θ) may be used to get a better distribution of line brightness.

For antialiased lines, errors in Lo are not significantly serious. Such errors would drop or add pixels relative to those generated via the "ideal" full-precision algorithm. However, all such pixels would get next to nothing for coverage anyway, so such errors would produce minimal error in the total coverage. This modified algorithm has a deviation from the ideal coverage sum of no more than approximately 3%, not counting the error from approximating 1/(sin θ+cos θ).

Turning discussion next toward example implementation, an example embodiment of the present invention will be described using an example system block diagram in an example personal computer (PC) system or environment. However, it is submitted that practice of the invention is not limited thereto, i.e., the invention may be practiced with other types of systems, and in other types of environments.

Figure 10:
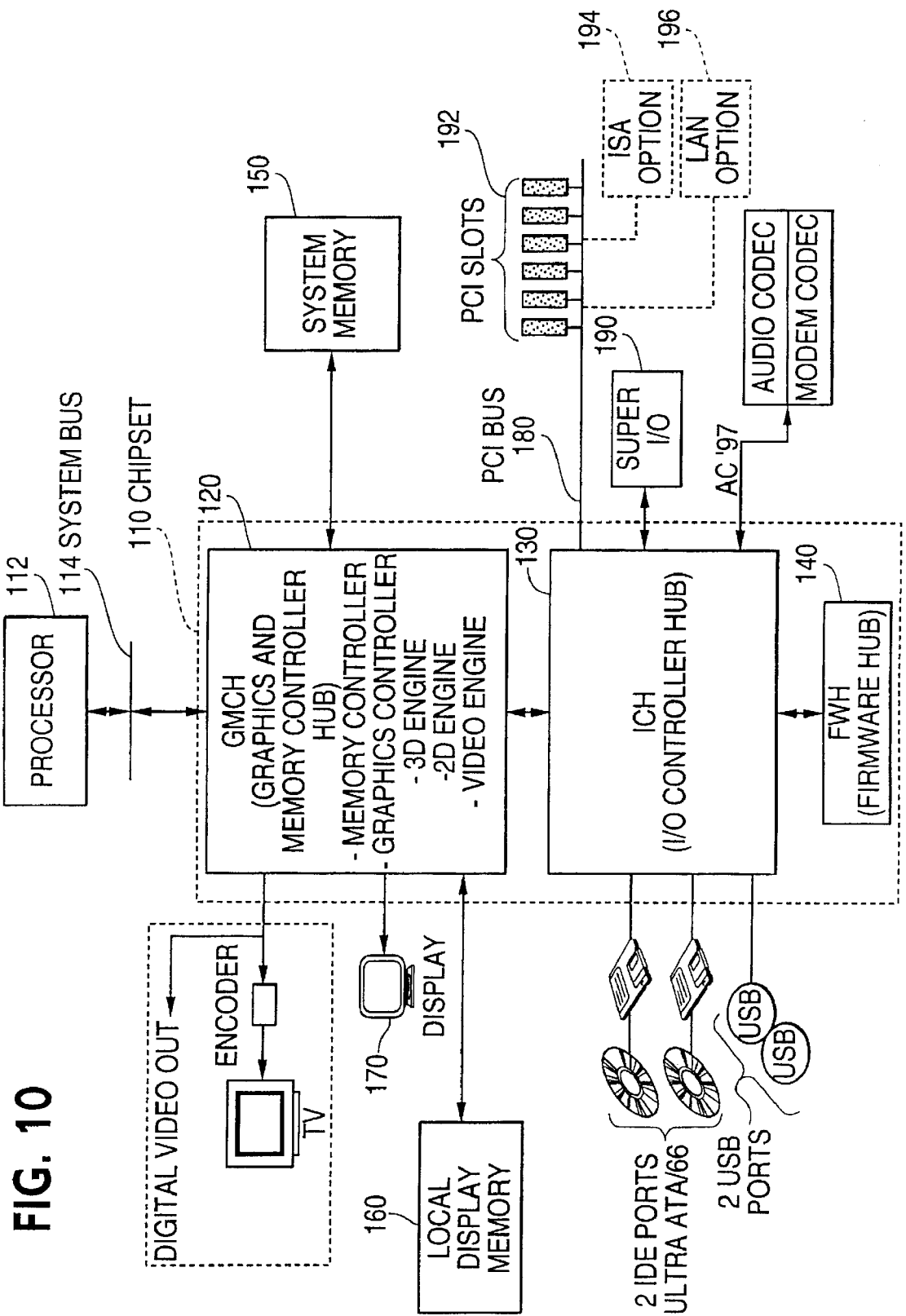
FIG. 10 is a block diagram illustrating an example personal computer (PC) system embodiment of the present invention.

Beginning such discussion, FIG. 10 is a block diagram illustrating an example personal computer (PC) system. Included within such system may be a processor 112 (e.g., an Intel® Celeron® processor) connected to a system bus 114. Although only one processor 112 is shown, multiple processors may be connected to system bus 114. In an example embodiment, the chipset 110 may be a highly-integrated three-chip solution including a graphics and memory controller hub (GMCH) 120, an input/output (I/O) controller hub (ICH) 130 and a firmware hub (FWH) 140.

The GMCH 120 may provide graphics and video functions and may interface one or more memory devices to the system bus 114. The GMCH 120 may include a memory controller as well as a graphics controller (which in turn may include various graphics sub-portions such as a 3-dimensional (3D) engine, 2-dimensional (2D) engine, video engine, etc.). GMCH 120 may be interconnected to any of a system memory 150, a local display memory 160, a display 170 (e.g., a computer monitor) and to a television (TV) via an encoder and a digital video output signal. GMCH 120 may be, for example, of a construction similar to an Intel® 82810 or 82810-DC100 chip. The GMCH 120 also operates as a bridge or interface for communications or signals sent between the processor 112 and one or more I/O devices which may be connected to ICH 140. As shown in FIG. 10, the GMCH 120 includes an integrated graphics controller and memory controller. However, the graphics controller and memory controller may be provided as separate components.

ICH 130 may interface one or more I/O devices to GMCH 120. FWH 140 is connected to the ICH 130 and may provide firmware for additional system control. The ICH 130 may be similar in construction to an example Intel® 82801 chip and the FWH 140 may be similar in construction to an example Intel® 82802 chip. The ICH 130 may be connected to a variety of I/O devices and the like, such as: a Peripheral Component Interconnect (PCI) bus 180 (e.g., PCI Local Bus Specification Revision 2.2 or higher) which may have one or more I/O devices connected to PCI slots 192, an Industry Standard Architecture (ISA) bus option 194 and a local area network (LAN) option 196; a Super I/O chip 190 for connection to a mouse, keyboard and other peripheral devices (not shown); an audio coder/decoder (Codec) and modem Codec; a plurality of Universal Serial Bus (USB) ports (e.g., USB Specification, Revision 1.0 or higher); and a plurality of Ultra/66 AT Attachment (ATA) 2 ports (e.g., X3T9.2 948D specification or higher, commonly also known as Integrated Drive Electronics (IDE) ports) for receiving one or more magnetic hard disk drives or other I/O devices.

Figure 11:
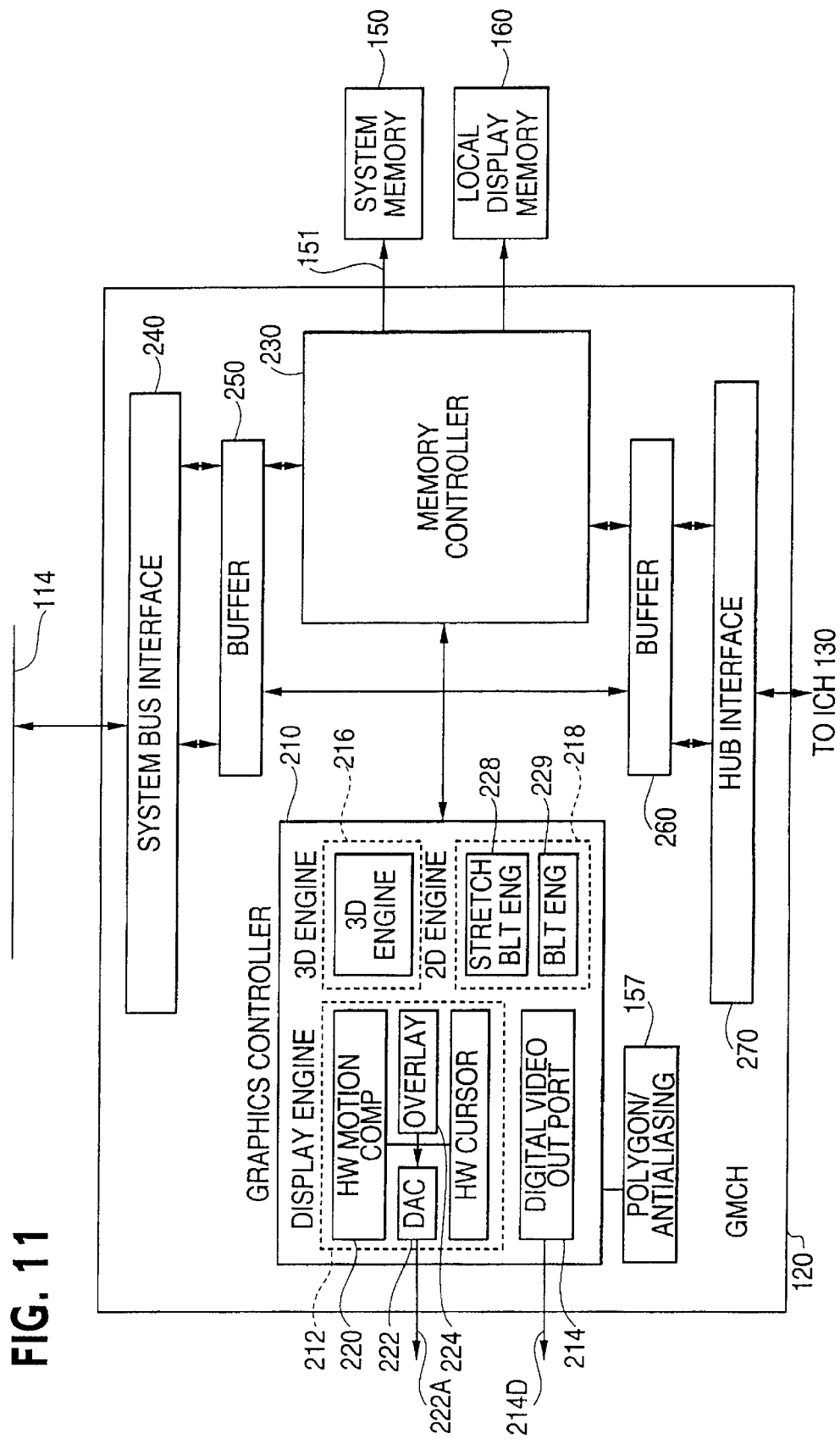
FIG. 11 is a block diagram illustrating an example graphics and memory controller hub (GMCH) embodiment, useable, for example, with the FIG. 10 example embodiment.

With the above overview of an example system as background, discussion now turns more specifically to portions of the memory controller and/or graphics controller of the GMCH 120. FIG. 11 is a block diagram illustrating a graphics and memory controller hub (GMCH) 120 according to an example embodiment. The GMCH 120 may include a graphics controller 210 to provide graphics and video functions and a memory controller 230 to control and interface one or more memory devices to the system bus 114. Memory controller 230 may be connected to the system bus via a buffer 250 and a system bus interface 240. The memory controller 230 may be connected to the ICH 130 via a buffer 260 and hub interface 270. As noted above, GMCH 120 may be connected to a system memory 150 and a local display memory 160.

The display memory 160 (also commonly referred to as video or graphics memory typically provided on a video card or video memory card) is optional. In a lower cost embodiment known as a unified memory architecture (UMA), the local display memory 160 is not present in the computer system. Rather, in the UMA embodiment, the system memory 150 operates as both system memory and the local display memory. The UMA embodiment is less expensive because the cost for the separate local display memory 160 is saved. However, the bandwidth or data rate over the bus 151 between the GMCH 120 and the system memory 150 is typically very limited. As a result, the UMA embodiment presents technical challenges to provide adequate graphics or video performance while using only the bandwidth-limited system memory 150 for storing and processing video frames for display.

The graphics controller 210 of GMCH 120 may include a display engine 212 for displaying video or graphics images, a digital video output port 214 for outputting digital video signals on output 214D, a 3D engine 216 for performing a variety of 3D graphics functions and a 2D engine 218 for performing 2D functions. The 3D engine 216 performs a variety of functions including texture mapping, bilinear and anisotropic filtering, MIP mapping, Gouroud shading, alpha-blending, fogging and Z-buffering. The 2D engine 218 includes a blitter (BLT) engine 229 and a stretch BLT engine 228 for performing fixed blitter and stretch blitter operations, which refer to a block transfer of pixel data between memory locations. The display engine 212 may include a hardware motion compensation engine 220 for performing motion compensation. Overlay function 224 may perform a YUV to RGB color conversion, while DAC 222 may convert digital video to analog video signals which are output on 222A. Further, the GMCH 120 may include a polygon/antialiasing arrangement 157. That is, such arrangement 157 may hardwired and/or programmed to provide antialiasing operations in accordance with the aforementioned example embodiment(s), and may be provided separately from, or as part of, the graphics controller 210. Thus, when the system (or GMCH 120) requires antialiasing services to be performed, example operations 1200 such as those illustrated within FIG. 12 may be conducted.

More particularly, after a start 1202, an antialiasing command 1210 may be issued and received. Thereafter, in an operation 1220, suitable information (e.g., line segment data, color data, etc.) may be provided. The antialiasing arrangement 157 then performs antialiasing services 1230 according to the aforementioned example embodiment (algorithm), and outputs 1240 antialiased graphics (e.g., pixel) data. Image or frame data (pixel data) is typically stored 1250 in the local display memory 160 (when present) or stored in the system memory 150 in the UMA embodiment, and ultimately may be displayed 1260 on (for example) the display 170. Operation 1290 signifies an end.

Further example embodiments will be described with respect to FIGS. 13 and 14. More particularly, FIG. 13 is an example flowchart 1300 concerning example operations conducted by a 3D engine of the FIGS. 10 and 11 example embodiments. That is, the context here is the 3D Engine 216 in FIG. 11. An operation 1304 concerns vertex transformation and clipping. Here primitives delimited by some number of vertices (1 for individual points, 2 for lines, and 3 for triangles) are mapped from a global coordinate system onto the display screen. Primitives that do not project onto the screen are rejected; primitives that fall off the screen are "clipped" to become a primitive that corresponds to the intersection of the projection of the original primitive and the window. Additionally, other attributes such as colors and texture coordinates are produced.

In an operation 1308, for all attributes (e.g., color) associated with a primitive, there is a computation (e.g., by hardware) of coefficients A,B,C where attribute (x,y)=Ax+By+C.

In an operation 1312, for each edge of the primitive (1 for lines, 3 for triangles), there is a computation of similar coefficients where Ax+By+C=0 along the edge.

In an operation 1316, a determination is made as to whether the primitive in question is a line. If not, flow path 1324 is followed. If yes, i.e., if the primitive is a line, then in an operation 1320, there is a computation of new coefficients for the equations:

$Lo1(x,y)=(Ax+By+C)+K$, and (Eq. Ln. 32)

$Lo2(x,y)=K-(Ax+By+C)$. (Eq. Ln. 33)

This corresponds to the method for computing the K for antialiased edges. Equations used for non-antialiased edges are somewhat different.

Finally, in an operation 1328, a rasterization is performed, where rasterization is the process of determining which pixels should be illuminated by the primitive and how the final image is affected by the primitive.

FIG. 14 is an example flowchart 1400 concerning example operations conducted with respect to the FIG. 13 rasterization operation, i.e., the context here is the rasterization operation 1328 of FIG. 13. The hardware first determines at a coarse level which pixels may be hit by the primitive. For each such pixel, a corresponding "fragment" is produced and the following steps are performed.

In an operation 1404, there is an evaluation of Lo(x,y) equations for each edge. For triangles, there would be three Lo values. For antialiased lines, there are four (two above, and two corresponding to the "end caps", which was not an area of interest in this invention).

In an operation 1408, it is determined if any Lo(x,y) value is negative if so, the pixel is fully outside the corresponding edge, even after any edge expansion (as in operation 1320). If the pixel is outside the edge, the corresponding fragment may be discarded as indicated by operation 1412.

In an operation 1416, the equations for attributes whose coefficients were computed in operation 1308 are now evaluated at (x,y). This produces a resulting color, depth value (for sorting primitives), and set of texture coordinates for the fragment.

Next, in an operation 1420, it is determined if the primitive should be antialiased. If not, the coverage is set to 100% as shown by operation 1424. If the primitive is antialiased, the portion of the pixel covered by the primitive should be computed as shown by operation 1428. In the context of this invention, it may be computed by taking MIN(Lo1(x,y), Lo2(x,y)) and then accounting for end caps.

In an operation 1432, texture mapping (if applicable) may be performed, where texture coordinates are used to perform lookups into predefined images and modify the fragment's color.

Continuing, in an operation 1436, fog (if applicable) may be performed, where distance from the viewer is used to fade distant primitives to a constant fog color.

Next, in an operation 1440, the coverage factor (from operation 1424 or 1428) may be multiplied by the fragment's alpha (opacity) to produce a new alpha value. For example an 80% opaque fragment that only covers 50% of the pixel would get a new opacity of 40% (0.8*0.5).

Finally, in an operation 1444, the fragment is combined with the color of the frame buffer to get a new frame buffer value. In the example above, if the fragment is white and the frame buffer pixel is black, the resulting frame buffer value will be 40% gray.

Accordingly, the FIG. 11 GMCH device 120 and/or the FIG. 10 system are operative to effect improved antialiasing coverage computation embodiment of the present invention. By "operative," it is meant that a claimed item (e.g., device, system, etc.) has the proper hardware, hardwiring and/or programming capable to accomplish the features/limitations of the claimed invention, but does not necessarily mean that an item has to be operating to infringe.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

Further, embodiments of the present invention may be practiced at least in part as a software invention, implemented in the form of a machine-readable medium having stored thereon at least one sequence of instructions that, when executed, causes a machine to effect the invention. With respect to the term "machine", such term should be construed broadly as encompassing all types of machines, e.g., a non-exhaustive listing including: computing machines, non-computing machines, communication machines, etc. Similarly, which respect to the term "machine-readable medium", such term should be construed as encompassing a broad spectrum of mediums, e.g., a non-exhaustive listing including: magnetic medium (floppy disks, hard disks, magnetic tape, etc.), optical medium (CD-ROMs, DVD-ROMs, etc), etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An antialiasing device operative to effect antialiased line pixel sampling using polygon sampling rules, the antialiasing device effecting an expanded rectangle algorithm using a line-to-rectangle expansion modifier of substantially K, where $$K=w/2*(1/(\cos\theta+\sin\theta))+\tfrac{1}{2},$$

where w is a width in pixels of a line to be displayed on a display, and θ is an angle of the line from a predetermined reference axis.

2. An antialiasing device as claimed in claim 1, where the expanded rectangle algorithm is operative to calculate, for each line, a quantity Lo(x,y) at each pixel (x,y) of $$Lo(x,y)=(\Delta Y/(\Delta X+\Delta Y))*(x-x0)+(\Delta X/(\Delta X+\Delta Y))*(y-y0),$$

where (x,y) give the coordinates of the pixel center, (x0,y0) and (x1,y1) are the endpoints of the line, and ΔX and ΔY are defined as x1−x0 and y1−y0, respectively, and where line-to-rectangle expansion is effected with respect to the line defined by the endpoints (x0,y0) and (x1,y1).

3. An antialiasing device as claimed in claim 1, where the antialiasing device comprises polygon rasterization hardware.

4. An antialiasing device as claimed in claim 1, where the antialiasing device is part of one of: a graphics chip and a graphics chipset.

5. An antialiasing means for effecting antialiased line pixel sampling using polygon sampling rules, the antialiasing means for effecting an expanded rectangle algorithm using a line-to-rectangle expansion modifier of substantially K, where $$K=w/2*(1/(\cos\theta+\sin\theta))+\tfrac{1}{2},$$

where w is a width in pixels of a line to be displayed on a display, and θ is an angle of the line from a predetermined reference axis.

6. An antialiasing means as claimed in claim 5, where the expanded rectangle algorithm is operative to calculate, for each line, a quantity Lo(x,y) at each pixel (x,y), of $$Lo(x,y)=(\Delta Y/(\Delta X+\Delta Y))*(x-x0)+(\Delta X/(\Delta X+\Delta Y))*(y-y0),$$

where (x,y) give the coordinates of the pixel center, (x0,y0) and (x1,y1) are the endpoints of the line, and ΔX and ΔY are defined as x1−x0 and y1−y0, respectively, and where line-to-rectangle expansion is effected with respect to the line defined by the endpoints (x0,y0) and (x1,y1).

7. An antialiasing means as claimed in claim 5, where the antialiasing means comprises polygon rasterization hardware means for performing polygon rasterization services and antialiasing services.

8. An antialiasing means as claimed in claim 5, where the antialiasing means is part of one of: a graphics chip and a graphics chipset.

9. A system comprising:
at least one of a local graphics memory array, a display and a power supply; and
an antialiasing device operative to effect antialiased line pixel sampling using polygon sampling rules, the antialiasing device effecting an expanded rectangle algorithm using a line-to-rectangle expansion modifier of substantially K, where $$K=w/2*(1/(\cos\theta+\sin\theta))+\tfrac{1}{2},$$

where w is a width in pixels of a line to be antialiased, and θ is an angle of the line from a predetermined reference axis.

10. A system as claimed in claim 9, where the expanded rectangle algorithm is operative to calculate, for each line, a quantity Lo(x,y) at each pixel (x,y) of $$Lo(x,y)=(\Delta Y/(\Delta X+\Delta Y))*(x-x0)+(\Delta X/(\Delta X+\Delta Y))*(y-y0),$$

where (x,y) give the coordinates of the pixel center, (x0,y0) and (x1,y1) are the endpoints of the line, and ΔX and ΔY are defined as x1−x0 and y1−y0, respectively, and where line-to-rectangle expansion is effected with respect to the line defined by the endpoints (x0,y0) and (x1,y1).

11. A system as claimed in claim 9, where the antialiasing device comprises polygon rasterization hardware.

12. A system as claimed in claim 9, where the antialiasing device is part of one of: a graphics chip and a graphics chipset.

13. An antialiasing method comprising:
effecting antialiased line pixel sampling using polygon sampling rules, by effecting an expanded rectangle algorithm using a line-to-rectangle expansion modifier of substantially K, where $$K=w/2*(1/(\cos\theta+\sin\theta))+\tfrac{1}{2},$$

where w is a width in pixels of a line to be displayed on a display, and θ is an angle of the line from a predetermined reference axis.

14. An antialiasing method as claimed in claim 13, where the expanded rectangle algorithm comprises:
calculating, for each line, a quantity Lo(x,y) at each pixel (x,y), of $$Lo(x,y)=(\Delta Y/(\Delta X+\Delta Y))*(x-x0)+(\Delta X/(\Delta X+\Delta Y))*(y-y0),$$

where (x,y) give the coordinates of the pixel center, (x0,y0) and (x1,y1) are the endpoints of the line, and ΔX and ΔY are defined as x1−x0 and y1−y0, respectively, and where line-to-rectangle expansion is effected with respect to the line defined by the endpoints (x0,y0) and (x1,y1).

15. An antialiasing method as claimed in claim 13, where the antialiasing method is performed at least in part by polygon rasterization hardware.

16. An antialiasing method as claimed in claim 15, where the polygon rasterization hardware is part of one of: a graphics chip and a graphics chipset.

17. A machine-readable medium having stored thereon at least one sequence of instructions that, when executed, causes a machine to:

effect antialiased line pixel sampling using polygon sampling rules, by effecting an expanded rectangle algorithm using a line-to-rectangle expansion modifier of substantially K, where $$K = w/2 * (1/(\cos \theta + \sin \theta)) + \frac{1}{2},$$

where w is a width in pixels of a line to be antialiased, and θ is an angle of the line from a predetermined reference axis.

18. A medium as claimed in claim 17, where the expanded rectangle algorithm comprises:

calculating, for each line, a quantity Lo(x,y) at each pixel (x,y), of $$Lo(x,y) = (\Delta Y/(\Delta X + \Delta Y)) * (x - x0) + (\Delta X/(\Delta X + \Delta Y)) * (y - y0),$$

where (x,y) give the coordinates of the pixel center, (x0,y0) and (x1,y1) are the endpoints of the line, and ΔX and ΔY are defined as x1−x0 and y1−y0, respectively, and where line-to-rectangle expansion is effected with respect to the line defined by the endpoints (x0,y0) and (x1,y1).

* * * * *